(12) United States Patent
Hughes

(10) Patent No.: US 9,813,439 B2
(45) Date of Patent: Nov. 7, 2017

(54) EVALUATION NODE FOR REPORTING STATUS VIA A SECURE LINK

(71) Applicant: Vidoc Razor, LLC, Kingwood, TX (US)

(72) Inventor: Aaron M. Hughes, Kingwood, TX (US)

(73) Assignee: Vidoc Razor, LLC, Kingwood, TX (US)

( * ) Notice: Subject to any disclaimer, the term of this patent is extended or adjusted under 35 U.S.C. 154(b) by 132 days.

(21) Appl. No.: 14/851,164

(22) Filed: Sep. 11, 2015

(65) Prior Publication Data

US 2017/0078320 A1    Mar. 16, 2017

(51) Int. Cl.
*G06F 17/30* (2006.01)
*H04L 29/06* (2006.01)

(52) U.S. Cl.
CPC ........ *H04L 63/1433* (2013.01); *H04L 63/029* (2013.01); *H04L 63/0236* (2013.01); *H04L 63/0272* (2013.01); *H04L 63/0428* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 6,282,546 B1* | 8/2001 | Gleichauf | G06F 17/30516 707/957 |
| 8,056,132 B1 | 11/2011 | Chang et al. | |
| 8,756,698 B2 | 6/2014 | Sidagni | |
| 2004/0193918 A1* | 9/2004 | Green | H04L 63/1433 726/22 |
| 2013/0185778 A1 | 7/2013 | Tamai et al. | |
| 2014/0013384 A1 | 1/2014 | Webb et al. | |
| 2014/0331327 A1 | 11/2014 | Maor et al. | |
| 2015/0222656 A1* | 8/2015 | Haugsnes | H04L 63/1441 726/23 |

* cited by examiner

*Primary Examiner* — Brandon Hoffman
(74) *Attorney, Agent, or Firm* — Robert C. Rolnik

(57) ABSTRACT

An evaluator node may obtain an IP address within a network to be tested, the network having multiple testable addresses other than the IP address. The evaluator node establishes a secure session to the server, where the evaluator node authenticates itself to the server using a predetermined key. The evaluator node, in response to establishing the secure session, assesses the testable addresses, wherein each of the first testable address and the second testable address are tested according to a pre-set test suite stored in the evaluator node. It reports a summary assessment, to the server, in response to at least one of the testable addresses being assessed. Subsequently, it may, sanitize itself, following receiving responses, detecting timeouts with respect to expected responses. The evaluator node may sanitize by at least erasing from memory at least one summary assessment and the predetermined key.

10 Claims, 7 Drawing Sheets

| ASSESSMENT FINDINGS PRIORITY SUMMARY ||
|---|---|
| Important | For Review |
| 613 <br> 501 | 594 <br> 503 |

505

| ATTACK COMPLEXITY ||||
|---|---|---|---|
| Low | Medium | High | Average Score |
| 570 | 55 | 0 | 6 |

507

| ATTACK VECTOR SUMMARY ||
|---|---|
| Vector | Count |
| Network | 625 |

511

| VULNERABILITY TYPE BREAKDOWN |||
|---|---|---|
| Attack Type | Count | Severity |
| Windows <br> General <br> Web Servers | | Security Hole <br> Security Hole <br> Security Warning |

SYSTEM: 192.168.0.149 _540
AVERAGE VULNERABILITY SCORE: 1
GENERAL OS INFO
GENERAL PORT INFORMATION  543
TCP PORTS UDP PORTS
22: ssh          443: https
161: snmp        623: asf-rmcp
GENERAL NOTES
161 (udp) A SNMP server is running on this host The following versions are supported
SNMP version1 SNMP version2c
SECURITY NOTES
SECURITY WARNINGS
SECURITY HOLES
Checks for the presence of Dell Remote Access Controller

550 {

_551                                   553
PORT: 443    RISK FACTOR: None      VULNERABILITY SCORE: 0
VULNERABILITY SUMMARY:
Summary: The remote host is running the Filemaker database server. FileMaker Pro is a cross-platform
relational database application from FileMaker Inc., a subsidiary of Apple Inc., has compatible versions    555
for both the Mac OS X and Microsoft Windows operating systems Solution: You should Allow
connection to this host only from trusted host or networks, or disable the service if not used.
VULNERABILITY SOLUTION:
You should Allow connection to this host only from trusted host or networks, or     557
disable the service if not used.
ASSESSMENT FINDINGS:
Summary: The remote Dell Remote Access Controller is prone to a default account authentication
bypass vulnerability. This issue may be exploited by a remote attacker to gain access to sensitive
information or modify system configuration without requiring authentication.
Solution: Change the password. It was possible to login with username "root" and password "calvin".

Fig. 5B

SYSTEM: 192.168.0.150
AVERAGE VULNERABILITY SCORE: 6      570
GENERAL OS INFO
GENERAL PORT INFORMATION    573
TCP PORTS        UDP PORTS
110: pop3        123: ntp
3389: ms-wbt-server  1434: ms-sql-m
389: ldap        53: domain
143: imap
53: domain GENERAL NOTES
143 (tcp) The remote imap server banner is : * OK The Microsoft Exchange IMAP4
service is ready.
SECURITY NOTES
NTP allows query of variables
PORT: 123 RISK FACTOR: None VULNERABILITY SCORE: 0
VULNERABILITY SUMMARY:
Summary: A NTP (Network Time Protocol) server is listening on this port.
Determines whether Microsoft DNS server is accessible and whether it discloses the internal hostname
PORT: 53 RISK FACTOR: None VULNERABILITY SCORE: 0
VULNERABILITY SUMMARY:
Microsoft DNS server seems to be running on this port. Internal hostname disclosed
(255.in-addr.arpa/SOA/IN):
server1.sf.local
VULNERABILITY SOLUTION:
http://support.microsoft.com/default.aspx?id=198410
ASSESSMENT FINDINGS:
Microsoft DNS server seems to be running on this port. Internal hostname disclosed
(255.in-addr.arpa/SOA/IN):
server1.sf.local
SECURITY WARNINGS
Use LDAP search request to retrieve information from NT Directory Services
                        581                              583
PORT: 389        RISK FACTOR: Medium    VULNERABILITY SCORE: 5
VULNERABILITY SUMMARY:
Summary: It is possible to disclose LDAP information. Description : The directory base of the remote server
is set to
NULL. This allows information to be enumerated without any prior knowledge of the directory structure.
Solution: If pre-Windows 2000 compatibility is not required, remove pre-Windows 2000 compatibility as      585
follows : - start cmd.exe - execute the command : net localgroup 'Pre-Windows 2000 Compatible Access'
everyone /delete - restart the remote host Plugin output : The following information was pulled from the
server via a LDAP request: NTDS Settings, CN=SERVER1,CN=Servers,CN=Default-First-Site-Name,
CN=Sites,CN=Configuration,DC=sf,DC=local
VULNERABILITY SOLUTION:
If pre-Windows 2000 compatibility is not required, remove pre-Windows 2000 compatibility as follows : - start
cmd.exe - execute the command : net localgroup 'Pre-Windows 2000 Compatible Access' everyone /delete -
restart the remote host
ASSESSMENT FINDINGS:                                                                                        587
Summary: It is possible to disclose LDAP information. Description : The directory base of the remote server
is set to NULL. This allows information to be enumerated without any prior knowledge of the directory
structure. Solution: If pre-Windows 2000 compatibility is not required, remove pre-Windows 2000
compatibility as follows : - start cmd.exe - execute the command : net localgroup 'Pre-Windows 2000
Compatible Access' everyone /delete - restart the remote
host Plugin output : The following information was pulled from the server via a LDAP request: NTDS
Settings,CN=SERVER1,CN=Servers,CN=Default-First-Site-Name,CN=Sites,CN=Configuration,DC

EVALUATION NODE FOR REPORTING STATUS VIA A SECURE LINK

BACKGROUND

The present invention relates to a computer implemented method, data processing system, and computer program product for qualitatively assessing local area networks and more specifically to permitting such assessments to be performed, in part, at a central server, outside the local area network.

Information Technology (IT) departments for organizations are in a constant battle to upgrade hardware, software and personnel policies to assure that only authorized employees and contractors modify their local area networks and data processing systems. Among the activities to defend against are spying, unauthorized command and control, and the leaking of information concerning the LAN that an IT department is charged with operating.

Some forms of vulnerability, that undermine these efforts, include poor password selection or policies; bad configurations to computer equipment; and defective or insecure software—sometimes referred to as obsolete. Evidence of such problems has traditionally been obtained by performing a network scan of one or more machines attached to a network.

However, to perform such a network scan, the device that performs the scan must be present on the network. This is perfectly fine for situations where the IT department has the staff, training and suitable device for scanning, including its scanning software. However, IT departments, especially for smaller organizations, either lack this functionality, or would like to audit the methods currently used in-house, by personnel that have different or better training, for example, by sub-contracting the job to specialists.

In the traditional way, specialists would appear onsite to the LAN, attach their scanning device, and wait for a full report to be produced, normally stored to a disk or other non-volatile storage in their device. However, the raw output from the scanning, was seldom suitable to provide a list actions to take to correct deficiencies in a manner understandable to an IT department. Accordingly, some alternative, less labor-intensive approach is needed.

SUMMARY

According to one embodiment of the present invention an evaluator node may obtain an internet protocol (IP) address within a network to be tested, the network having multiple testable addresses other than the IP address. The evaluator node establishes a secure session to the server, where the evaluator node authenticates itself to the server using a predetermined key. The evaluator node, in response to establishing the secure session, assesses the testable addresses, wherein each of the first testable address and the second testable address are tested according to a pre-set test suite stored in the evaluator node. It summarizes at least one of a response from the first and second testable addresses to form a summary assessment in a process called normalization. It reports the summary assessment, to the server, in response to at least one of the testable addresses being assessed. Subsequently, it may, sanitize itself, following receiving responses, detecting timeouts with respect to expected responses. The evaluator node may sanitize by at least erasing from memory at least one summary assessment and the predetermined key.

According to another embodiment of the present invention, a server receives a sequence of packets, the sequence of packets originating from a source address, and each containing at least a portion of a predetermined knock. The server can determine, that at least the two data fields among the packets matches a predetermined knock. The server, in response to the determining the knock is correct, may open a security port to packets from the source address and receive authentication credentials over a virtual private network tunnel established from the security port to the source address, wherein the authentication credentials are previously determined and shared at the report generator and at an evaluator node present on a network under test at the source address. The server can receive at least one summary report from the source address over the virtual private network tunnel, wherein the summary report comprises at least a response or an implicit non-response of at least one node on the network under test. In response to receiving the at least one summary report, the server may generate a first actionable report to include a qualitative description of the at least one node based on the at least one summary report, the qualitative description based on at least one security bulletin. In addition, the server may receive a packet from the source address, the packet indicating the virtual private network tunnel is complete, and in response, removing the authentication credentials from a list of valid authentication credentials.

BRIEF DESCRIPTION OF THE DRAWINGS

FIG. 5B is a detail page of an actionable report in accordance with an embodiment of the invention; and FIG. 5C is a detail page of an actionable report in accordance with an embodiment of the invention.

DETAILED DESCRIPTION

Figure 1:
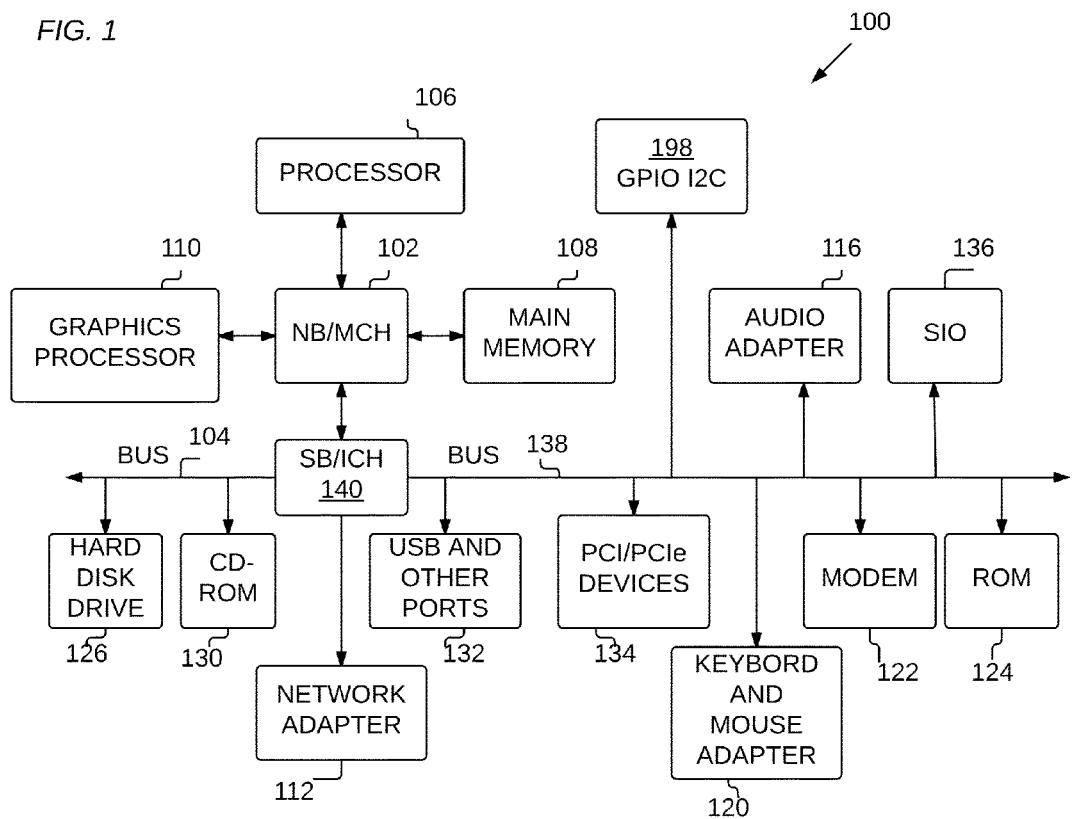
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104. A general purpose input output (GPIO) (Inter-Integrated Circuit) I$^2$C 198 provides analog/digital pins to receive inputs and transmit output from the bus 138.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the data processing system(s) described herein, may respond to properly formed packets and passwords, to establish a Virtual Private Network (VPN) to receive summary reports by an evaluator node placed within a remote client network. The summary reports provide both network architecture details, as well as functionality advertised and/or reported at each evaluated node in the evaluated network. The report generator, on the other hand, receives those reports via the VPN and further processes those details to a user digest or actionable report, suitable to inform either a) security personnel of deficiencies in the client network and/or node functionality; or b) laypeople of the scope of the task to amend and/or remediate the client network to a state having fewer vulnerabilities to unauthorized use.

Figure 2:
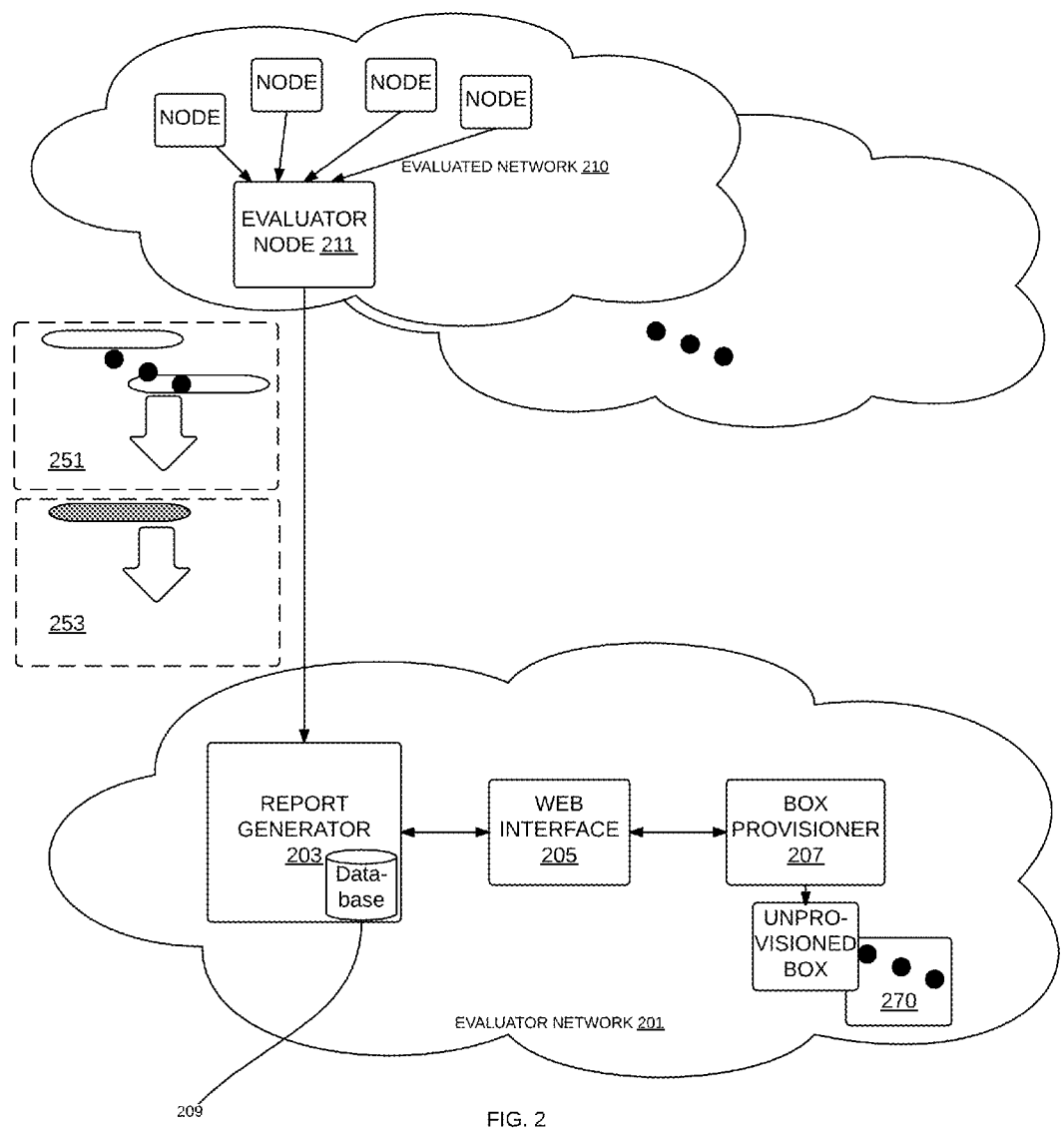
FIG. 2 is a block diagram of an evaluated network and a evaluator network of servers in accordance with an embodiment of the invention.

FIG. 2 is a block diagram of an evaluated network and a evaluator network of servers in accordance with an embodiment of the invention. Evaluated network 210 may establish connectivity via an evaluator node 211 a virtual private network tunnel 215 to an evaluator network 201. Evaluated network 210 can be a network of an IT department that desires testing or assessment of the nodes for potential security risks. Evaluator network 201 may be comprised of report generator 203, web interface 205 and box provisioner 207, each of which may be, an example of a data processing system 100 of FIG. 1. Database 209, receives data and responds over localhost/port-forwarding connection. Database 209 may be a process operating within report generator 203. Evaluator network 201 generates value in the reports it can generate concerning the evaluated network.

The evaluator node 211 may initiate a session to the report generator 203 or other server within the evaluator network through a series of packets. At least two packets may be transmitted to the report generator 203 as a knock 251 in order to establish a base level of authentication. However, the knock, if correctly provided to the report generator, does not fully expose the report generator, and the report generator may require a further predetermined key 253 to be transmitted from the evaluator node 211 before the report generator actually responds. Both the knock and predetermined key are explained further, below, with reference to FIG. 3.

The steps up to, and beyond the authentication, just described, include setting up the evaluator node 211 in the secure environment of the network 203. Before the evaluator node even gets added to the evaluated network, box provisioner 207 may be used to originate and distribute to the evaluator node 211 and the report generator 203 both the knock and the predetermined key. Devices that are being prepared to become evaluator nodes are present as unprovisioned box(es) 270. Further details may be added to the evaluator node 211, for example, specific details of what are the suitable IP addresses to test once the evaluator node 211 is added to the evaluated network, or a specific pre-assigned IP address for the evaluator node 211 once installed to the evaluated network 210. Suitable IP addresses may be addresses in an industry standard range. For example, a class C network can include the industry standard range 192.168.0.0 to 192.168.255.255. The provisioning of the evaluator node can include specifying the class of the network to be tested as well as any limitations as to the ranges to be tested, that is, by limiting the range of addresses to smaller than an industry standard range. Next, the agent or staff member of the owner/operator of the evaluator network 201 may ship or otherwise deliver the evaluator node 211 to the evaluated network. Actual installation of the evaluator node can be performed by adding a power connection and a suitable Ethernet cable. Between the shipping and installation of the evaluator node, the owner/operator of the evaluated network may receive security bulletins from a trusted network of colleagues that monitor and research information technologies for vulnerabilities. A vulnerability can include the ability to cause the server to write arbitrary data to arbitrary memory or disk locations. As such, a vulnerability can allow unknown persons to take control of a data processing system that exhibits the vulnerability. Such security bulletins may be obtained from a national vulnerability database, as used by the U.S. government. A security bulletin is a report or data structure, that identifies a status identifier of a hypothetical data processing system, for example, a node within evaluated network, and further provides some qualification concerning the status identifier, for example, "secure", "best practices", "insecure", "unconfirmed insecurity" and the like. The security bulletin can include specific conditions that may cause such a data processing system or node to be susceptible to control or access by unknown third parties. The status identifier is a response or even a content of a response that a node gives in response to port scanning.

Alternatively, the owner/operator may, themselves, discover a vulnerability during this latency period, and themselves contribute a security bulletin to the report generator. As such, the manner in which the report generator characterizes or qualifies future reports, that it may receive from the evaluator node, may be changed in response to updated security bulletins. Next, the evaluator node and report generator perform an authentication, as described in more detail below in FIG. 3. Then, the report generator can receive summary reports from the evaluator node 211. A summary report is a report, for one or more nodes in the evaluated network, that describes if a node responded to packets transmitted from the evaluator node 211 to one or more ports at each node under test. Further, if the response includes data content, such as a version number or other details of software resident to the node under test, then such content may be placed in the summary report, or even added to the summary report in an abbreviated form. The report generator can, in reliance on the summary reports, compare the data stored therein, to up-to-the-minute security bulletins in order to qualify a specific response from a specific node as secure, insecure, or indicate other conditions or comments concerning the responses. Similarly, since the bulk of the responses in the summary reports may be characterized as secure, the report generator my synthesize the summary reports into solely describing insecurities discovered, and reporting on the extent and qualities of the assessments performed.

An owner/operator may use web interface 205, in response to orders and payments by a client, to scope out the job of the evaluator node. The scoping of the job can include choosing among strategies to scan a network that may be a) discover nodes to assess; or b) provide range of internal subnets to test. Further details may be added by the owner/operator to select an optional external assessment, which can be an assessment directed at the evaluated network from outside the evaluated network, for example, from the evaluator network. The web interface 205 can further collect a choice between a) selecting of a DHCP assigned IP address or b) selecting a static IP address for the evaluator node 211.

The web interface 205 can also include information concerning payment status for a specific client and communicate that data to the report generator for storage in database 209. Finally, at the command of the owner/operator, the web interface may trigger the box provisioner 207 to generate the knock and predetermined key for an unprovisioned box, and the report generator. The report generator, can store the knock and predetermined key to a list of valid credentials. When these provisioning features are added to an unprovisioned box, the unprovisioned box can become an evaluator node.

A knock is a password disguised to appear as or within a sequence of packets. In other words, the header of the packet, e.g., type, flags, (e.g. UDP/TCP), and the like, can be the password data. The permutations of the password can reside in the following features of the plural packets: 1) port numbers (as destination of the packet); or 2) data field size specification, for example, in a sequence such as $PN_1$; $PS_1$; $PN_2$; $PS_2$; $PN_3$; $PS_3$, etc., in for example, a set of three packets having a destination port number, designated as $PN_1$ and packet size, designated as $PS_1$ for the first packet in the sequence. Accordingly, the industry accepted role of each field in, for example, an Ethernet packet, may be subverted and re-purposed for carrying password data. As such, a data field is any field in an Ethernet or other packet that contains information other than the sequence information concerning the order in which the packet was sent. Plural variables may operate as a payload for purposes of authentication, for example, size; type; etc., in other words, subverting the industry-standard properties of the packet fields for purposes of obfuscating the password place values. The actual industry-standard convention of using the data contents of the packet may also be used to contain password data or entirely ignored when crafting the knock. The knock can be used in addition to an actual password and certificate exchange, as described further below.

Figure 3:
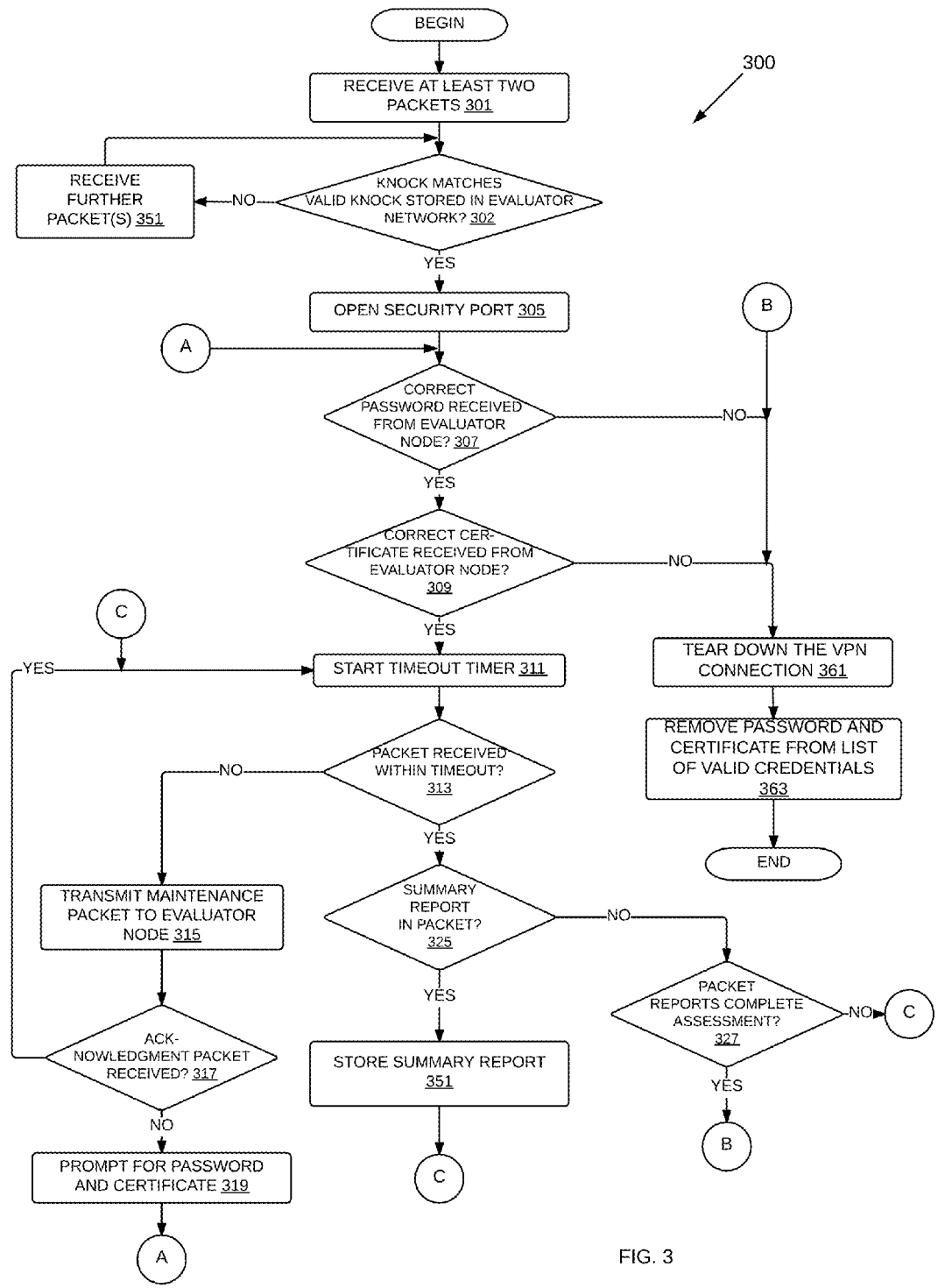
FIG. 3 is a flowchart of steps performed at a data processing center in the evaluator network in accordance with an embodiment of the invention.

FIG. 3 is a flowchart of steps performed at a data processing center in the evaluator network, for example, by evaluator network 201 in accordance with an embodiment of the invention. Tasks to be performed in the flowchart may be performed, for example, by report generator 203, of FIG. 2. The report generator may be distinct from a firewall, or integrated in with a firewall. In other words, a common data processing system may host functions of both the report generator and firewall. Alternatively, a standalone, firewall may operate as an initial screener in coordination with the report generator within network 201. In that case, the plural report generator and firewall may perform in a coordinated fashion, the functions described in flowchart 300. Accordingly, either of these configurations can be referred to as the report generator.

Initially, report generator 203 receives at least two packets (step 301). The report generator evaluates at least these two packets by extracting from them, data purportedly forming a valid sequence of matching data, or the knock. In general, the testing for the knock, and other authentication features, forms a set-up process for creating a VPN link from evaluator node 211 to the report generator 203, as explained with reference to steps 302, 305, 307 and 309, below.

Report generator 203 may determine, in the process of setting up a VPN to evaluator node 211, if a correct knock is received (step 302). Failure to receive a correct knock, or receiving an incomplete knock, may cause the report generator to receive further packets (step 351). Report generator 203, in response to the correct knock, that is, one listed as valid, opens a security port to the evaluator node 211 (step 305). A security port, is a internet protocol port previously agreed on in the provisioning of the evaluator node. Opening a security port can include transmitting an acknowledgment packet to a source of the correct knock, in this case, the evaluator node 211. Pre-set authentication keys shared between evaluator node 211 and report generator 203 are used to build the virtual private network (VPN) tunnel. The report generator 203 may ignore any packets arriving to its specialized security port that a) do not meet the criteria of correct sequence of the knock, and b) fail to arrive within a preset timeout period. In other words, report generator 203 may ignore pings to the security port prior to reaching step 307, below. The packets are considered to be from a common source, and ordered according to their packet serial number, if the packets each carry the same source address.

In response to a correct knock at step 302, the report generator 203 may determine if the correct evaluator node password is received from the evaluator node 211 (step 307). As part of determining if the correct password is received, the report generator may also require that a correct user identifier or other identifier of the evaluator be received in reference to the password. In response to the correct evaluator node password being received at the report generator 203, the report generator may test the operation of the VPN tunnel. This testing can include the report generator encrypting a packet according to the password and sending it to the source address of the evaluator node. A VPN is properly set up, when a responsive packet or packets arrive from the source address, and are decrypted to an expected result by the report generator.

Next, the report generator may determine if a correct certificate is received from the evaluator node over the VPN (step 309). A certificate can be a digital sequence of data used to verify that a user sending a message is authentic to a second machine, in this case, the report generator. The certificate may use public/private key certificate encryption, and information of the certificate, or looked up based on the certificate can be used to encode replies that the user is able to decode. Report generator 203 can establish port forwarding, in response to a positive result to step 309, via localhost to database 209. Accordingly, the evaluator node 211 may communicate to database 209 in the native command and query format of the database. If the evaluator node lacks parameters to conduct the assessment, the evaluator node may request the parameters from the database.

Failure to receive the correct password at step 307 may result in processing being terminated. Similarly, failure to receive the correct certificate at step 309 may result in both terminating operations on the virtual private network (VPN), and terminating further, later, steps of flowchart 300.

The report generator 203 may start a timeout timer (step 311). If that time-out expires, without the report generator receiving a summary report from the evaluator node 211, then the report generator may rebuild the VPN in reliance on the evaluator node 211, again, providing the correct password and certificate. Accordingly, the more typical operation, is for the report generator 203 to receive steady summary reports from the evaluator node 211. These reports may be received according to either a) a range of subnets previously established for the evaluator node 211 to test; or b) a set of nodes discovered by the evaluator node 211 scan at the client network.

Next, during an interval prior to time-out expiration, the report generator 203 may receive a packet from the evaluator node. In other words, report generator 203 may receive a packet before timeout expiration (step 313) and further, determine that the packet is or partially contains a summary report (step 325). A positive determination at step 325 can cause the report generator to store such features to a data structure, for example, as mediated and recorded by a database (step 351). The storing function can be delegated to a database, for example, database 209 of FIG. 2. As such, the database can be a service offered by the same data processing system that performs the steps of flowchart 300. Alternatively, a second data processing system may be used, to coordinate with the report generator and perform the operations of the database. Data to be stored, can be, the identity of a port or ports that respond and specific responses from the node under test. A bad response from a node under test, can include a string sent from a http server operating in the node under test, such as, an Apache HyperText Transport Protocol (http) server version that is a known vulnerability. Processing can resume at step 311 to restart the timeout timer.

A negative determination at step 313, namely, that a packet fails to be received within the timeout, may cause the report generator 203 to transmit a maintenance packet to the evaluator node 211 (step 315). Report generator may determine whether an acknowledgement is received to that maintenance packet, from the evaluator node 211 (step 317). A positive determination at step 317 may cause the report generator 211 to restart the timeout timer (step 311). Otherwise, the report generator may prompt the evaluator node for the password and certificate (step 319).

Subsequent to step 319, the report generator may resume performing steps at step 307.

A positive determination at step 313 may be followed by the report generator determining if a summary report is received (step 325). A negative determination at step 325 may cause the report generator to determine if a packet indicating a completed assessment is received (step 327). If the packet is not indicating a completed assessment, then the time-out timer may be restarted at step 311. Steps 313-319 can be optional, for example, when the evaluator node is configured to perform periodic maintenance of the tunnel.

On the other hand, if the packet indicating completed assessment is received, the report generator may conclude the operations over the VPN. This conclusion occurs in at least two steps. First, the report generator may tear down the VPN connection (step 361). Tearing down the VPN connection can include ignoring packets received at the port, except to determine if a new session is to begin (per 300 flowchart, in general), and refusing to acknowledge any packets received at the port. Second, the report generator may remove the password and certificate, used in the VPN session, from the list of valid credentials (step 363). The list, so changed, is the one it relies upon to evaluate the packets at steps 307 and 309, above. Additionally, the report generator can, as a third sub-step, remove the details of the knock from a list of valid knocks. Accordingly, after the third sub-step, not even a second attempt to gain admittance at step 302 will be acknowledged by the report generator. Processing may terminate thereafter.

A negative result at steps 307 or 309 may also lead to the report generator performing steps 361 and 363. Accordingly, the password and certificate, as predetermined keys, may become invalid in this manner too. The report generator may also invalidate the knock at this time. In some configurations, step 361 may be optional, and instead, the report generator might detect that the evaluator node tears down the VPN. In such a case as the report generator determining that the evaluator node tore down the VPN, the report generator removes password and certificate from the valid credentials and then terminates processing.

The conclusion of transfer of summary reports to the report generator, for example, after processing terminates, may create data structures that contain the normalized data for each IP address and port that is tested, regardless of whether each such IP address and port responded prior to timeout expiration. As such, at any time, the database may be queried for reports concerning all IP addresses to generate both detailed reports of the completed assessment, as well as executive summaries, for which examples are given in FIGS. 5A-5C. Each such executive summary or detailed report may form an actionable report. An actionable report, identifies specific nodes, ports, and responses from the respective node, along with any qualification concerning the security of the node. Normalized data is described further with reference to FIG. 4, below.

Figure 4:
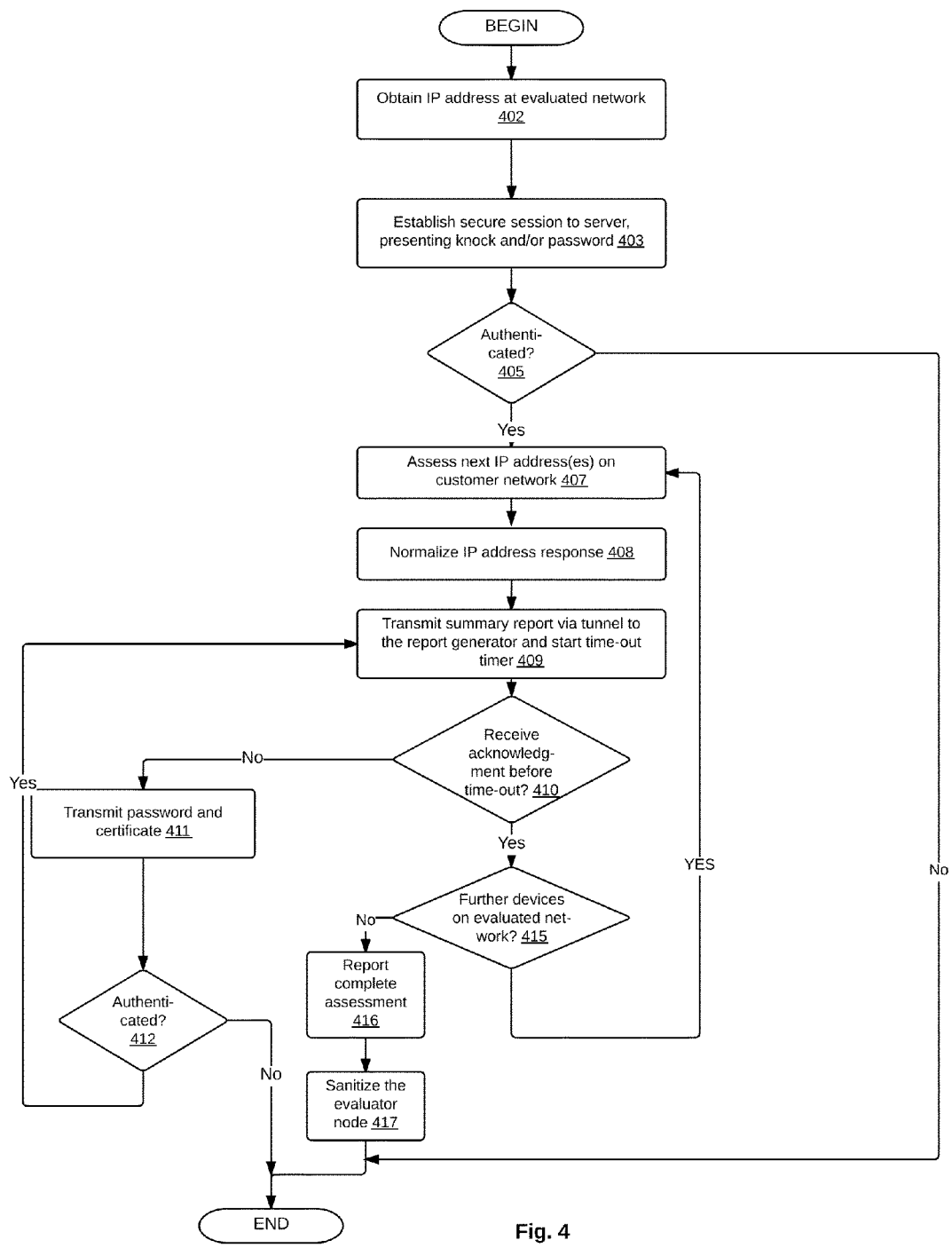
FIG. 4 is a flowchart of steps performed at an evaluator node in accordance with an embodiment of the invention.

FIG. 4 is a flowchart of steps performed at an evaluator node in accordance with an embodiment of the invention. The evaluator node is a client-side computer, at least during its operational status. Prior to the operation of the steps in FIG. 3, the evaluator node is provisioned with details of the assessment to be performed, and delivered to the evaluated network. Such provisioning may be performed with the evaluator node attached to the evaluator network, in contrast with the FIG. 2 depiction of the evaluator node. Later, a technician may remove the evaluator node from the evaluator network and dispatch or attach the evaluator node to a suitable Ethernet or other network interface that has access to the subnets of the evaluated network. The technician powers up the evaluator node, and the evaluator node performs power on systems tests, which may be followed by boot-loading an operating system to the evaluator node.

Then, the steps of FIG. 4 may begin in earnest. First, the evaluator node may obtain an internet protocol (IP) address within the network to which it is attached (step 402), in this case, the evaluated network 210 of FIG. 2. The IP address may be previously assigned to the evaluator node, for example, during provisioning, or it may be assigned, ad hoc, from a dynamic host configuration protocol (DHCP) server on the evaluated network. The evaluated network, has at least two nodes for testing, for example, reachable from a first testable address and a second testable address—again, these testable addresses may adhere to the IP protocols.

Next, the evaluator node may present packets to a server, such as the report generator of FIG. 2. If the evaluator node and the report generator have matching information, in this regard, the evaluator node may establish a secure session with the server (step 403). As described above, the secure session may be according to a VPN tunnel. Further, the evaluator node may provide a login and password combination as a predetermined key. A predetermined key is any previously shared data that the two devices store or otherwise access for purposes of authenticating at least one device in the session. The predetermined key can include a password and a certificate. In this case, the evaluator node authenticates itself to the report generator, and the report generator operates as a server.

The evaluator node may, in coordination with the report generator, determine if the evaluator node is authenticated (step 405). In other words, the evaluator node, may determine if the report generator acknowledges that the evaluator node may send data to the evaluator node in summary reports. Authentication can be through the use of Advanced Encryption Standard (AES), or the like.

Next, the evaluator node may assess a first testable address, and any other testable addresses that the evaluator node either has among its range of subnets to test or that the evaluator node discovers in the evaluated network (step 407). The assessments may be performed in batches or in any sequential manner. For example, in one embodiment, a first ping and a second ping may be issued from the evaluator node before getting a result, be it a timeout, or a acknowledgment packet. As such, each of the pings, directed to each testable address, may be an assessment conducted in parallel, to determine if each testable address responds to each respective ping. A ping can be an Internet Control Message Protocol (ICMP) ping or an Address Resolution Protocol (ARP) ping. Each such result, whether a timeout, or an acknowledgment, may be recorded to the evaluator node's memory. As a further example, an evaluator node may attempt to transmit default passwords known to be used by manufacturers, or even to use a dictionary attack attempting to determine if known and lesser known passwords are accepted by a testable address and acknowledged with access. Successful attempts may also be recorded to the evaluator node's memory.

The evaluator node may normalize data it receives from each IP address (step 408). Normalizing is the process of taking a wide variety of inputs, including unexpected inputs, and characterizing those inputs (or results from an IP address) into a finite number of categories. Normalizing can include creating a summary report by discarding redundant data present in at least one of a response from the first testable address and the second testable address. A category can be a high level category, such as "security hole" or "security warning". A category can be a lower level and more detailed category, such as, "Checks for the presence of Dell Remote Access Controller 550" or "Use LDAP search request to retrieve information from NT Directory Services". These categories may be symbolically looked up within a database—and thus, performing normalization can be to convert a detailed response to a shorter code that is used as a key to obtain the more complex word formulations of the specific category. Accordingly, normalization or the act of normalizing an IP address response, can be selecting a code or a key corresponding to the IP address response. In other words, the code or key may operate as an index of more detailed English-language descriptions that can be substituted for the code or key, particularly, at a time of making a detailed report of the outcome of an assessment.

Figure 5A:
FIG. 5A is an actionable report in accordance with an embodiment of the invention.
Figure 5A:

The selection of the code or key may rely on logic derived from a known vulnerability. In other words, a specific known vulnerability may be present if a IP address response include a string "version number 2.1.5" or "Darwin edition". As such, the normalizing may test IP address responses against this logic rule, and many others to characterize the IP address response to the code or key. Necessarily, a prerequisite to the presence of such logic in an evaluator node, is that the vulnerability, and the corresponding logic, be available in the evaluator network at the time an evaluator node is created. In other words, the logic can be downloaded to the evaluator node in order to make the particular vulnerability to be known by virtue of it being stored in the evaluator node. Later deployment of the evaluator node can make the particular vulnerability known when the evaluator node is later placed in the evaluated network. An example of a parsed output is shown in FIG. 5A-C. The normalized output generated at step 408 can be transmitted to the database and later formed into an actionable report, particularly, once the assessment is completed, as later determined at FIG. 3, explained above.

When sufficient results are recorded, for example, multiple determinations that a particular testable address acknowledged a ping, the evaluator node may transmit a summary report to the report generator and start a time-out timer (step 409). A summary report, is a file or other data record that contains the result of one or more tests or assessments of a node on a network. The summary report can include the code or key used to categorize the evaluated node. Such keys can index to a high level category, a lower level category, or both. The tests can be to determine if a particular testable address of the node responds to particular packets. The summary report can include the actual responses of a node targeted for assessment. These responses can include, for example, server response, server banners, and other information. Alternatively, the tests can be a determination that a response contained a particular string, for example, a status report concerning the version of a server that is operating, such as an Apache http server. At a minimum, the summary report can include a specific testable address, the kind of test performed, the result determined, the beginning and end times of the testing, and where applicable, a status that no response occurred within a timeout period. The summary report may be encrypted, for example, using a key used in the setup of the VPN tunnel, and then packetized and sent to the report generator. Even though an evaluator node may be able to perform as many as 67,000 different tests on a testable address, the assessment characterizations can miss some responses that later turn out to be vulnerabilities. As such, more refined reviews of the summary reports can be tested, parsed or otherwise matched to newer vulnerabilities, as they become known at the report generator.

The summary reports can be a raw format, that, as yet, lacks any qualitative tagging concerning whether the specific result of a specific test is secure, insecure, vulnerable, or vulnerable with further specific qualifications as to the specific vulnerability. A raw assessment is the unparsed content of the summary reports, logged to a file. The raw assessment is considered 'raw' since it lacks any qualitative opinion concerning the security status of the node(s) that provide the source data. Because the security field is extremely dynamic, a test result that is not vulnerable on a day prior to the evaluator node being dispatched, can become vulnerable on a day that the evaluator node is installed to the evaluated network. Accordingly, the qualitative analysis, data reduction and other reporting is performed at the report generator so that up-to-the-minute qualitative remarks can be automatically added to the report and made suitable for customer review. As such, the historical patterns of responses can be evaluated against a newer set of vulnerability bulletins (at least as expressed in matching/parsing) so that the report can be refreshed at the report generator.

Next, the evaluator node may determine whether it received an acknowledgment from the report generator before the time-out timer expires (step 410). If the evaluator node makes a positive determination, the evaluator node may determine if further testable addresses or devices are present on the evaluated network or otherwise among the range of testable addresses for testing (step 415). If there are further testable addresses, the evaluator node resumes at step 407.

However, in response to a negative determination at step 211, the evaluator node may report the assessment is complete to the report generator (step 416). Subsequently, the evaluator may sanitize itself (step 417). Sanitizing may be performed to reduce or eliminate any sensitive data from the evaluator device that the owner or operator of the evaluated network wants to maintain as confidential. The sanitizing can include erasing from memory a summary assessment and the predetermined key. Further steps may prophylactically encrypt all or portions of non-volatile memory used during the previous steps of FIG. 4 and overwriting the memory with the result of the encryption. Redundant overwriting may be performed on non-volatile memories that may have residual trace information, as might occur on disk media operated in the performing of one or more steps of FIG. 4. In addition, any other provisioned details of the evaluator node may also be encrypted or overwritten, for example, using the Linux command 'dd' to place pseudo-random stream onto the disk media via "dd if=/dev/urandom of=/dev/sda bs=1M".

In response to sanitizing the evaluator node, a technician may disconnect the evaluator node and return it to the premises of the owner/operator of the evaluator network, for provisioning the evaluator node for a fresh assignment at another evaluated network.

From time to time, the evaluator node might not receive an acknowledgment prior to the time-out timer expiring at step 410. In that case, the evaluator node may transmit a password and certificate to the report generator (step 411). Step 411 can be less involved than step 403 in that the evaluator node does not need to retransmit the knock. Next, the evaluator node can determine if it is authenticated to the report generator (step 412). If it is authenticated, the evaluator node may again transmit a summary report to the report generator and start a time-out timer at step 409. However, if it is not authenticated, the evaluator node may terminate processing.

The report generator may, from time to time, receive security bulletins. The report generator can retrieve an archive or raw assessment as an input to generate a new version of the actionable report. The report generator may then parse the raw assessment using criteria from the security bulletin(s) to produce a refreshed actionable report and store it to the database. The refreshed actionable report may include a date, as well as a description of which security bulletin(s) operated as the criteria by which the actionable report was created. The report generator may be able to transmit the actionable report to a client promptly after generating the actionable report. Alternatively, the report generator may wait until the client makes a follow-up request for the actionable report before sending the actionable report to the client.

The parsing step may attempt to match version numbers and other responses of an assessed node to version numbers or other specific responses known to be vulnerable, and then flag the specific vulnerability for that node by setting a value in a table corresponding to that specific vulnerability. The form of matching can be matching to a specific string, or loose matching, such as is possible by using wild-cards and ranges. Accordingly, a database entry, that indicates at least one vulnerability for a specific assessed node can have a row of values entered, that would normally be sparse, but include at least one binary positive value entered for the corresponding vulnerability. For an example where 67,000 vulnerabilities are searched per node, the table can be sparse, and include a single positive value among the 67,000 possible storage locations in the database row. The responses can be stored to at least one additional field of the database row. It is appreciated that the database can be dynamic to add further storage locations as new vulnerabilities become known. Accordingly, the responses can be retrofitted to additional parsing criteria to provide an indication of new vulnerabilities periodically as the vulnerabilities are discovered.

FIG. 5A is an actionable report in accordance with an embodiment of the invention. The actionable report, being a qualitative report, can be stored and replaced, if it should become obsolete. The source data for the actionable report can also be stored for later reprocessing, if needed. A raw assessment is the unqualified results from the summary reports from the evaluator node. The raw assessment includes the raw output of the evaluator node, or otherwise condenses the output from the evaluator node for later retrieval, for example, from the database. The raw output can include any codes or keys used to index more meaningful, English-language descriptions. The actionable report may include an initial executive summary that provides statistics concerning the overall health of the network. The executive summary can be broken down into four or more subsections. These subsections concern risks or vulnerabilities by priority; attack sophistication prerequisites; attack vector; and vulnerability type breakdown. The subsection "risks or vulnerabilities by priority" separates vulnerabilities into two groups, namely vulnerabilities that exist without any qualification or condition 501 and vulnerabilities that can exist but with further conditions or qualifications that are necessary for the vulnerability to be exploitable 503.

The subsection "attack sophistication prerequisites" may subdivide the vulnerabilities into varying degrees of necessary sophistication on the part of the attackers. Sophistication can be a measure of the computing resources available to an attacker; the level of trusted relative to the network-under-attack that the attacker can access; any prerequisite for social engineering by the attacker to obtain unauthorized access, and the like. For example, low complexity attacks do not require any special conditions in order to perform such attacks. The degrees of sophistication may use word formulas such as "Low complexity"; "Medium complexity" and "High complexity", and tally a number of nodes and/or vulnerabilities assigned to each level of complexity 505.

The subsection "attack vector" 507 provides a tally of those vulnerabilities that are further qualified into degrees of access of the attacker to the targeted network. The degrees of access can be likened to a Bacon number. In other words, the degrees of access can be 0 if the attacker has physical access directly to a network node. A single degree off from the network, but an attack from an external computer that links through conventional routers can be a 1 degree of access. Utilization of botnets by an attacker can be a 2 or higher degree of access. A suitable moniker for the 0 degree of access is "network". In the example report, there are only "network" vulnerabilities 507.

The subsection "vulnerability type breakdown" can sum a count of vulnerabilities according to a vulnerability type 511. A vulnerability type can be an English language summary of the attack, such as, malware, privilege escalation, buffer overflow, and the like. By English terminology, it is meant the terminology understandable to an IT professional that has some basic understanding of security functions. Furthermore, the vulnerability type may be further qualified as "Security hole" in a situation where the vulnerability requires no special preconditions or qualifications in order to exploit. In contrast, a vulnerability type may be further qualified as "Security warning" if there are additional, and perhaps unknown, conditions that are required in addition to the discovered condition at the node. Security holes and security warnings are explained further, with respect to FIG. 5B.

FIG. 5B is a detail page of an actionable report in accordance with an embodiment of the invention. The detail page can be one of many detail pages that report for each distinct node, what are the determined security issues, if any. Report 520, can include a suitable identifier, for example, Internet protocol (IP) address 540. Additionally, an average vulnerability score 543 is listed. A lower score indicates a lower vulnerability to exploitation by an attacker than a higher average vulnerability score. A highest vulnerability score may be 10. The report may additionally identify ports and services in use at the node. In other words, for each service that the node responded to, within allotted time-outs, such responses are indicated by, for example, port number, and service that properly responds.

Report 520 may contain reports of security holes and security warnings, for example, security holes section 550. The security hole can have several parts. The report may list an applicable port 554 at which the security hole is present. Further, the security holes section may list a risk factor 551, which may be "none", "low", "medium" or "high". Third, the security hole can include a vulnerability score 553. The vulnerability score, as explained, may be within a range of 0 to 10. The vulnerability score can contribute to an average vulnerability score, for example average vulnerability score 543. In addition, the security holes may have a vulnerability summary 555. The vulnerability summary can be an English language summary of the attack, such as, malware, privilege escalation, buffer overflow, and the like. The vulnerability summary can be more detailed description than the vulnerability type, and can include some explanation of the origin of the vulnerability.

The security holes section can further include a vulnerability solution 557. The vulnerability solution can be instructions for an IT professional to follow to remedy the vulnerability. The security holes section can provide additional information in an assessment findings subsection, which can include particular strings received from the node during the assessment, or, reasonable inferences developed from other responses by the node. For example, a reasonable inference is that when a node under test challenges the evaluator node for a password, and the evaluator node provides a specific word selected from, e.g., a dictionary, like "password", and the tested node responds with access to the node—then the specific word, in this case, "password" is the password for gaining access to the node.

FIG. 5C is a further detail page of an actionable report in accordance with an embodiment of the invention. IP address 570 can be set to 192.168.0.150 for this node. The node may have an average vulnerability score 573 set to six. In this case, the node has a security warning section 560. The risk factor 581 is set to "medium", and the vulnerability score 583 is set to five. Plural sections each indicating a different security warning or security hole may be present, but are omitted in this Figure. Like the system with IP 192.168.0.149, the individual vulnerability scores contribute to the average vulnerability score.

A vulnerability summary 585 indicates that the vulnerability relates to Lightweight Directory Access Protocol (LDAP). LDAP as an acronym, is sufficiently detailed for an IT professional to understand, and as such, is sufficiently clear to be used in descriptions of vulnerability summary and the more concise "vulnerability type". The vulnerability summary 585 can include a vulnerability solution 587.

In each of the security warnings and security holes, specific strings or values obtained in a response from a node, or reasonably inferred from a node response can be provided. Some of these strings or values that can come directly from the node responses include port number, version number (if applicable), password used to secure access. Other values placed in the report may be looked up from a database that provides a subjective relation of the symptoms of the vulnerability to risk factors and vulnerability scores. The looking up can be in reliance on a key or code provided when the evaluator node normalized its responses received in the evaluated network. The looking up is performed either with respect to a data store in the evaluator node, a data store within the evaluator network, or even a data store within a national data store outside the evaluator network and potentially plural lookups, as might occur when one of such data stores is obsolete or otherwise deprecated.

Accordingly, the embodiments of the invention may permit specific machines to be added to a network to be evaluated in order to obtain raw results of port scanning and other network testing. The raw results, encapsulated to one or more summary reports, may be transmitted, under encryption, to a server that further processes the results into at least one actionable report. If sufficient time has elapsed since the results are returned to the server, the server may obtain security bulletins that identify criteria to flag and qualitatively indicate that a particular result is "insecure", or otherwise requires attention to improve security. Accordingly, a client network owner can select a server operated by a security organization, that is responsive to public security bulletins and, potentially, have access to alternative security bulletins from non-traditional sources. As such, the talents of the security organization can be focused on locating and vetting security bulletins for potential inclusion as a source of criteria for parsing raw results for security risks. Furthermore, the security organization can minimize actual presence of their personnel at remote networks owned by the client.

The present invention may be a system, a method, and/or a computer program product. The computer program product may include a computer readable storage device (or media) having computer readable program instructions thereon for causing a processor to carry out aspects of the present invention.

The computer readable storage device can be a tangible device that can retain and store instructions for use by an instruction execution device. The computer readable storage device may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage device includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage device or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage device within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage device that can direct a computer, a programmable data processing apparatus, and/or other devices to function in a particular manner, such that the computer readable storage device having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for assessing network vulnerability, the computer implemented method comprising:

obtaining an Internet Protocol (IP) address within a network to be tested, the network having at least a first testable address and a second testable address other than the IP address;

establishing a secure session to a server, where a client-side computer authenticates itself to the server using a predetermined key;

in response to establishing the secure session, assessing the first testable address and the second testable address, wherein each of the first testable address and the second testable address are tested according to a pre-set test suite stored in the client-side computer;

normalizing at least one of a response from the first testable address and the second testable address to form a summary assessment, wherein a failure to respond within a preset time is also a response;

reporting the summary assessment, to the server, in response to at least one of the first testable address and the second testable address being assessed;

in response to completing assessing the first testable address and the second testable address, sanitizing the client-side computer;

wherein sanitizing comprises at least erasing from memory:
at least one summary assessment; and
the predetermined key.

2. The computer implemented method of claim 1, further comprising testing industry standard ranges for all devices in the network, wherein the first testable address is one address among all devices in the network and the second testable address is among all devices in the network.

3. The computer implemented method of claim 1, wherein the first testable address and the second testable address are among a list of addresses preset in an evaluator node and assessing is performed solely on the list of addresses.

4. The computer implemented method of claim 1, wherein reporting the summary assessment comprises transmitting the summary assessment, in encrypted form, via the secure session.

5. The computer implemented method of claim 1, further comprising, receiving from the server, a prompt for the predetermined key, and in response, transmitting the predetermined key to the server, thereby establishing a second secure session to the server.

6. The computer implemented method of claim 1, further comprising, discovering the first testable address and the second testable address by transmitting at least one packet to each internet protocol address of the network to be tested.

7. The computer implemented method of claim 1, further comprising, looking up a criteria of addresses to test, wherein the criteria of addresses to test include the first testable address and the second testable address, and the criteria is less than all internet protocol addresses of the network.

8. The computer implemented method of claim 1, wherein normalizing comprises creating a summary report by discarding redundant data present in the at least one of a response from the first testable address and the second testable address.

9. A computer implemented method for assessing network vulnerability, the computer implemented method comprising:

receiving a sequence of packets at a report generator, the sequence of packets originating from a source address, each containing at least a portion of a predetermined knock;

determining, that at least two data fields of the sequence of packets match the predetermined knock;

in response to the determining, opening a security port to packets from the source address and receiving authentication credentials over a virtual private network tunnel established from the security port to the source address, wherein the authentication credentials are previously determined and shared at the report generator and at an evaluator node present on a network under test at the source address;

receive at least one summary report from the source address over the virtual private network tunnel, wherein the summary report comprises at least a response or an implicit non-response of at least one node on the network under test;

in response to receiving the at least one summary report, generating a first actionable report to include a qualitative description of the at least one node based on the at least one summary report, the qualitative description based on at least one security bulletin, wherein the at least one security bulletin comprises a first criterion to match to a first node responses, wherein generating the first actionable report further comprises storing the at least summary report among a set of summary reports from the source address as a raw assessment, and subsequently, receiving at least one second security bulletin and parsing the raw assessment based on the at least one second security bulletin to obtain a second actionable report that differs from the first actionable report;

receiving a packet from the source address, the packet indicating the virtual private network tunnel is complete, and in response, removing the authentication credentials from a list of valid authentication credentials subsequent to receiving the least one summary report, receiving a second security bulletin, the second at least one security bulletin comprises a second criterion to match to a second node response, wherein the second node response is not described in the at least one security bulletin, and a second qualitative description corresponding to the second node response;

determining that the at least one summary report matches the second security bulletin; and in response to determining that the at least one summary report matches the second security bulletin, transmitting an actionable report that indicates that a node referenced in the at least one summary report exhibits the second node response not described in the at least one security bulletin.

10. The computer implemented method of claim 9, wherein the first actionable report comprises at least one selected from the group of node identification, port, and response made by a node.

* * * * *